United States Patent [19]
Mordowitz et al.

[11] Patent Number: 6,011,794
[45] Date of Patent: Jan. 4, 2000

[54] INTERNET BASED TELEPHONE APPARATUS AND METHOD

[75] Inventors: Tamar Mordowitz, Monsey; Max Moskowitz, Flushing, both of N.Y.

[73] Assignee: Netplus Communications Corp., Monsey, N.Y.

[21] Appl. No.: 08/711,211

[22] Filed: Sep. 9, 1996

[51] Int. Cl.[7] .................... H04J 3/06; H04J 3/17; H04L 12/28; H04M 11/00
[52] U.S. Cl. .................. 370/389; 370/352; 370/401; 370/427; 379/90.01; 379/100.16
[58] Field of Search ................ 370/352, 353, 370/380, 389, 392, 396, 401, 404, 427, 435, 450, 465, 485; 379/90.01, 93.01, 93.05, 93.09, 100.15, 100.16

[56] References Cited

U.S. PATENT DOCUMENTS

| | | | |
|---|---|---|---|
| 5,327,486 | 7/1994 | Wolff et al. | 379/96 |
| 5,526,353 | 6/1996 | Henley et al. | 370/60.1 |
| 5,557,659 | 9/1996 | Hyde-Thomson | 379/88 |
| 5,568,540 | 10/1996 | Greco et al. | 379/89 |
| 5,608,786 | 3/1997 | Gordon | 379/100 |
| 5,726,984 | 3/1998 | Kubler et al. | 370/349 |
| 5,791,992 | 8/1998 | Crump et al. | 463/41 |
| 5,805,507 | 9/1998 | Norris et al. | 370/352 |
| 5,818,836 | 10/1998 | DuVal | 370/389 |
| 5,905,959 | 5/1999 | Foladare et al. | 455/445 |
| 5,907,677 | 5/1999 | Glenn et al. | 395/200.6 |

*Primary Examiner*—Fan S. Tsang
*Assistant Examiner*—Allan Hoosain

[57] ABSTRACT

An internet related telephone accessory connects directly to conventional home and business telephones and enables the establishment of long distance telephone connections through the internet, realizing substantial savings in long distance telephone tolls. The telephone accessory initiates, in response to dialing of a long distance telephone number, a process which calls that telephone number through the internet. If the receiving telephone is not connected at the time of the call to its internet service provider (ISP), the telephone accessory calls the dialed telephone conventionally, i.e. through a long distance telephone service (MCI, ATT, SPRINT, etc.) and electronically signals it (in the space of less than about a second) to connect itself to the internet. Thereafter, the accessory redials the called telephone over the internet, so that the parties could converse (or transmit fax messages and the like) over the internet at local telephone rates.

22 Claims, 7 Drawing Sheets

6,011,794

INTERNET BASED TELEPHONE APPARATUS AND METHOD

BACKGROUND OF THE INVENTION

The present invention relates to telephones and, more particularly, to a telephone accessory which realizes savings in long distance tolls and to a related method.

Traditionally, long distance voice telephony has used standard telephone instruments and the public switched networks (AT&T, MCI, SPRINT, etc.) to set up and make long distance calls. This involves using a standard telephone handset to dial a called party which initates connections through a local segment by a Local Exchange Carrier (LEC) and a long distance segment through the transmission & switching facilities of a long distance inter-exchange carrier (IEX). Toll charges for long distance calls therefore are comprised of two components: the local segment charged by the LEC and the long distance segment charged by the IEX. Toll charges for the long distance segment are typically based on distance and are considerably more expensive.

Recently, with the advent of the Internet, which is essentially a high speed digital data backbone network with worldwide points of access, several software vendors have introduced software that runs on conventional PC's that digitizes voice conversations and permits the transmission of telephone-like digital voice conversations over the Internet. This allows users with PC's that are outfitted with this internet voice software and special sound generating boards and microphones to initiate and carry on voice conversations for the cost of a local internet connection, thereby effectively obtaining free long distance service.

While this is functional, it suffers from several drawbacks. First, it requires the user to initiate calls and carry-on conversations from a PC. This feels unnatural to most users who are accustomed to making calls from their cordless or standard telephone. Even more problematic, it requires the called party who is receiving the via-the-internet call to be continuously logged on to his or her internet service provider (ISP) because there is no other way of signalling the called party that a call is about to be received. This has two main disadvantages. Some internet service providers charge customers based on usage of time. Secondly, a telephone line needs to be dedicated just for the internet connection. Most conventional telephone users would find this unacceptable. Recently, one vendor has announced an Internet Phone Gateway (IPG) that allows PC users to call conventional telephones by placing an internet call from a PC to a service provider's IPG that then places the call to the destination. This too suffers from two disadvantages. Firstly it requires the call to originate from a PC and second it requires the originator to subscribe to a service that provides IPG's.

SUMMARY OF THE INVENTION

Accordingly, it is an object of the present invention to provide a via-the-internet telephone accessory (ITA) and method which operates in conjunction with conventional telephones, at both the sending and receiving ends.

Another object of the present invention is to provide a telephone accessory which provides low cost dialing of long distance telephone numbers.

A further object of the invention is to provide a method and apparatus for long distance communication via the internet without use of a personal computer or an internet phone gateway (IPG).

It is a further object of the invention to provide a method of using the conventional telephone network as a means to signal a receiving ITA or other internet telephony device to automatically connect to the internet to prepare itself to receive an internet call.

It is a further object of this invention to provide a method of using the conventional telephone network as a means to signal a receiving ITA or other internet telephone device to automatically call back the calling party.

It is another object of the present invention to provide for voice detection at the receiving ITA to rapidly differentiate between an ITA-to-ITA setup call versus a regular telephone call to minimize the ITA processing delay at the receiver for a conventional voice call.

It is a further object of the invention to provide a means to call back the calling ITA over the internet by using the ANI capability of the conventional telephone network. The called ITA would look up the E-mail address associated with the calling telephone number in its non-volatile memory look up table to accomplish this.

Yet another object of the invention is to provide a small sized, e.g. telephone sized, palm sized (or even smaller) device that could be easily connected or attached to a standard telephone and which enables virtually free long distance calling.

The foregoing and other objects of the invention are realized with what is essentially an internet-based telephone accessory (ITA) in the form of a modem box that houses a modem and processing circuitry. One such modem is directly connected to the caller's telephone and another to a called party's telephone, enabling telephone to telephone calling through the internet without the need to use cumbersome PC's. Once an internet connection has been established, each ITA serves to convert analog voice originating at each telephone set to a stream of compressed digital voice suitable for transmission over the internet, in well known manner. To this end, each ITA houses a MODEM for transmitting at a rate of at least 28 Kbytes per second, a CODEC for converting signals from analog to digital and from digital to analog format, and a processor, for example, a 486 uP, for general control and for executing various known voice compression algorithms.

Other features and elements of the invention will become apparent from the following detailed description of the invention and from the accompanying drawings.

DETAILED DESCRIPTION OF THE DRAWINGS

Figure 1:
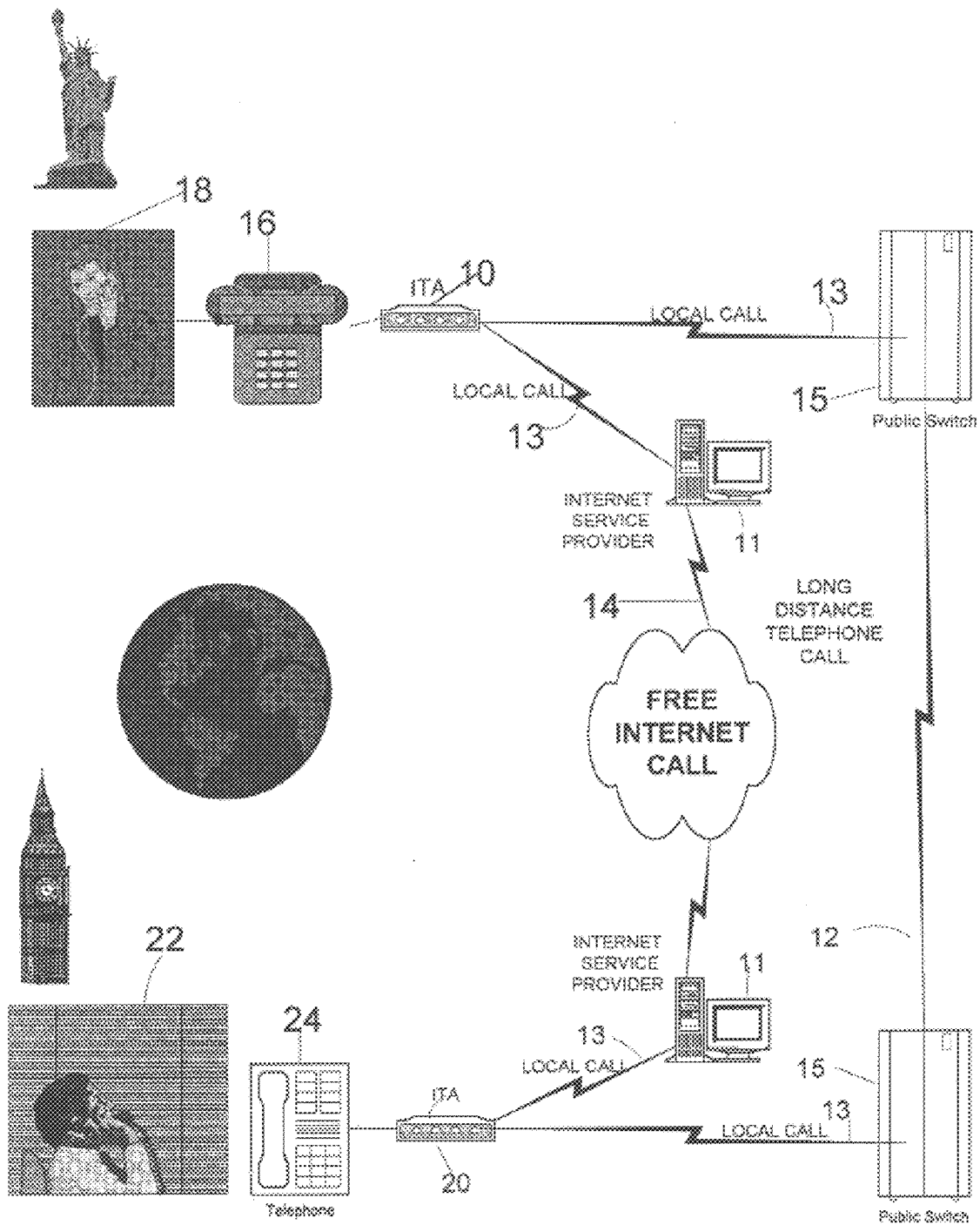
FIG. 1 is a diagram illustrating the overall concept of the present invention.

FIG. 1 illustrates the overall concept of the present invention in which a first internet telephone accessory (ITA)

10 communicates with a similar or identical second internet telephone accessory 20 via either conventional long distance telephone lines 12 or over the internet telephone trunks 14. In a manner to be described, the first ITA 10, which is connected to a calling telephone 16 of a first user 18 who might be located in New York City, enables virtually free and limitless long distance communications with a second user 22 of a second called telephone 24 which might be located in London. Just as easily, the second user 22 may initiate the call to the first user 18.

In either case, the function of the ITA's 10 and 20 is to establish a voice communication path over the internet trunk lines 14 between the telephones 16 and 24 as well as to convert outgoing analog voice to digital signals for transmission over the internet and incoming digital voice arriving from the internet to analog form usable by the telephones 16 and 24. The purpose of the conventional telephone lines 12 will become apparent further on.

In well known manner, conventional long distance calls are routed over local telephone lines 13 via exchange switches 15 unto the long distance lines 12. In the internet world, calls are routed via internet dedicated digital data lines 14 which are accessed by calling internet service providers (ISP) 11.

Figure 2:
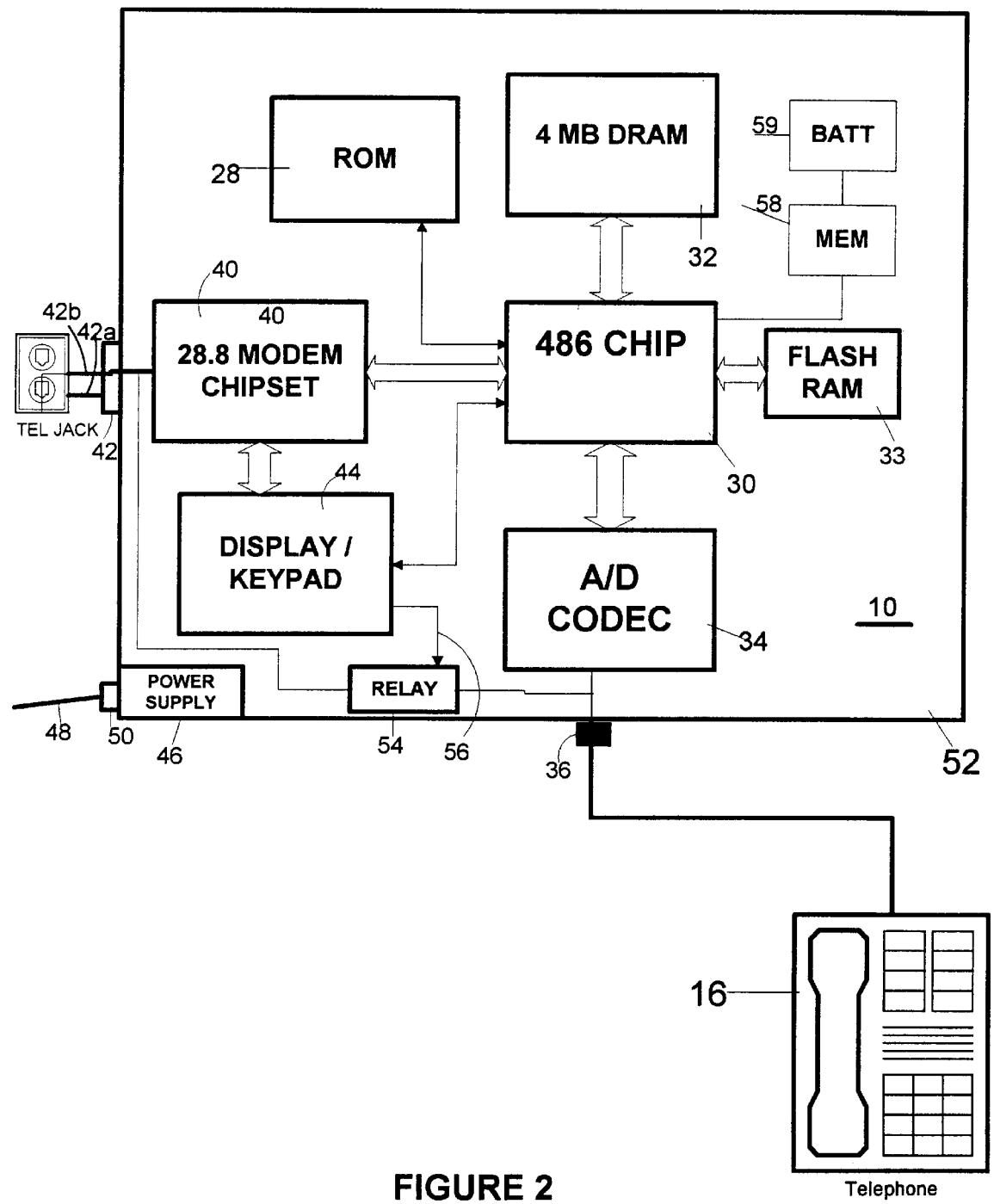
FIG. 2 is a block diagram of the main circuit components of the internet telephone accessory (ITA) of the present invention.

As shown in FIG. 2, the ITAs 10 and 20 typically include a central processing unit for example a microprocessor 30, such as an Intel 486 device or the like, that is provided to run a stored computer program (to be described) which is resident in a non-volatile memory such as a ROM 28 and which further operates in conjunction with dynamic RAM 32 and flash RAM memory 33, all in well known manner.

The A/D Codec 34 is connected between the microprocessor 30 and the telephone 16, 24 (via telephone jack 36) and functions to convert analog voice signals to digital data and vice versa. It further communicates to the microprocessor 30 information about the telephone 16, 24, such as on-hook/off-hook data, the pressing of various keys, etc. Access to either the telephone lines 12 or internet trunks 14 is provided via the MODEM circuit 40, for example a device that can send and receive serial digital data at 28.8 Kbits per second, which is sufficiently fast for voice transmission over telephone lines. Again, the connection is through a standard quick connect telephone jack 42. An optional display/keypad circuit 44 is interfaced with the microprocessor 30 and Codec 40 to enable displaying of information at the ITA 10,20 and/or the inputting of commands to the microprocessor 30. The telephone jack 42 can be designed to connect to a single or a pair of telephone lines 42a, 42b as shown.

An optional power supply 46 receives line power from electrical line 48 via connector 50 which power it converts to low voltage dc power for the electrical components in the ITA housing 52. Alternatively, the ITA can be powered by an external power pack similar to those used for many consumer electronic appliances, e.g. tape players. When the ITA 10 is not powered, the relay 54 operates to connect the telephone 16 directly to telephone jack 42, bypassing the ITA 10. Optionally, the display/keyboard 44 may include a switch that activates a signal line 56 to the relay 54 to bypass the ITA 10.

Telephone numbers, e-mail addresses, names and the like can be stored in a writable non-volatile memory such as in the CMOS memory 58 which relies on backup power from the battery 59 or in the flash RAM memory 58.

Figure 3:
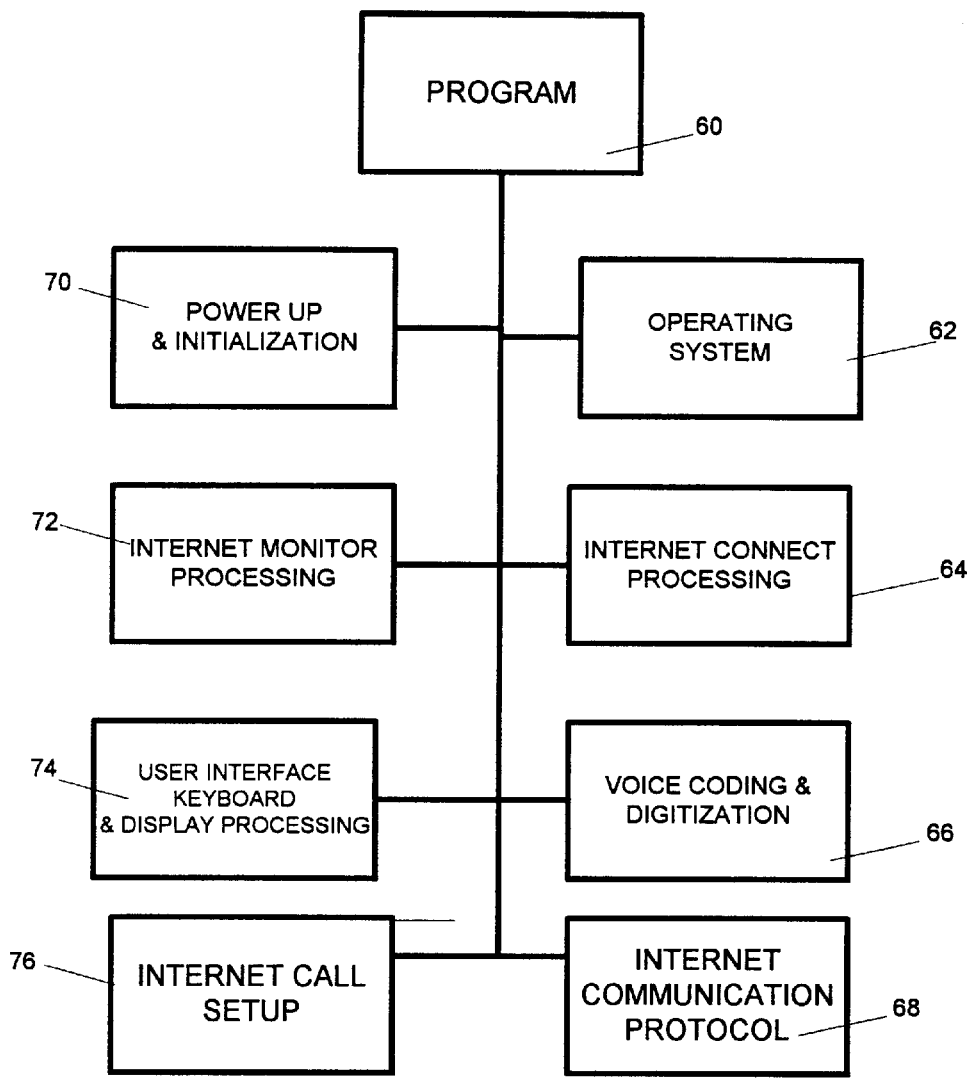
FIG. 3 is a software block diagram of the main software blocks or functions implemented in the ITA.

The method of the present invention is carried out under control of a master program 60 (FIG. 3) which is executed by the microprocessor 30. Major components of the program 60 include the operating system 62 which controls the overall operation of the ITA 10 and power up & initialization block 70. Internet connection logic and related processes are performed by the internet connect processing block 64, voice coding & digitization and compression & decompression block 66, internet communications protocol 68, internet monitoring block 72; user interface keyboard & display processing 74, and internet call setup block 76 as described below.

Figure 4:
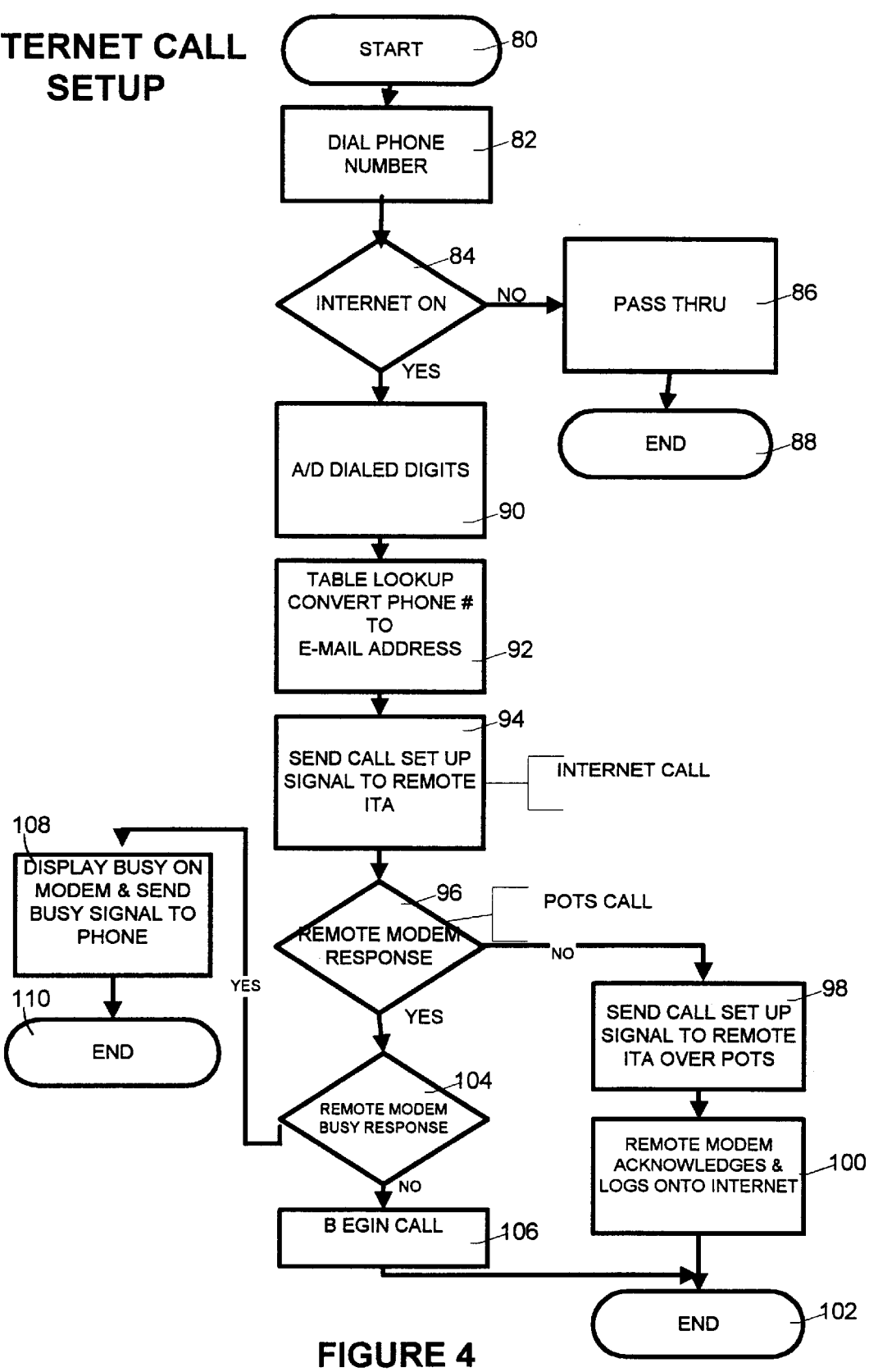
FIG. 4 is a software block diagram of the internet call setup function.

Referring to FIG. 4, setting up a call involves the step 80 which senses that the phone 16 has been placed off-hook and the dialing of a number at step 82. If the ITA 10 is already connected to the internet ISP 11 (FIG. 1), the program proceeds from step 84 to convert the dialed number to digital values at step 90, to enable the software at block 92 to convert the dialed number to an e-mail address by consulting a look up table in the memory 58. Using the e-mail address, the program sends (at step 94) a call setup signal to the ITA 20 (FIG. 1) via the internet lines 14, and awaits a response at software block 96.

When the ITA 20 is connected to its ISP 11, it responds to the call from the calling ITA 10 by recognizing a digital code sequence from the calling ITA. The called ITA then rings the called telephone 24 and conversation between the parties 18 and 22 is enabled once the called party has answered the call. See steps 86, 88. If, on the other hand, the ITA 20 does not respond to the internet call, the software dials the remote ITA 20 over the conventional telephone lines 12 and transmits a call set up signal that includes its own telephone number and E-mail address. This prompts that ITA to acknowledge the calling modem and log onto the internet as indicated at steps 98 and 100. After a suitable delay the ITA 10, attempts to complete the call again by restarting at step 92. Alternatively, the called ITA may call back the calling ITA 10, once it has logged-on to the internet.

Note that placement of the conventional call to the called ITA 20 can proceed either over the telephone line 42a usually dedicated for calling the ISP 11. In this case, the calling ITA 10 has to log off the internet temporarily. However, if the user is able to provide the second line 42b (FIG. 2), the conventional call to the ITA 20 can proceed over this conventional line, avoiding the delay ensuing from having to log off and then back on unto the internet.

If, on the other hand, the modem 20 responds and indicates that it is not busy (step 104), the two telephones 16,24 are now in communications with one another. The two parties 18,22 can now freely converse (step 106) with one another over the internet, during which analog voice signals emanating from the telephones are continuously converted by the codec's 34 to a stream of digital bytes that are received, processed and compressed by the microprocessors 30 to data suitable for transmission over the internet lines 14 by the modems 40.

In the event that the called ITA 20 is busy at step 104, a busy display is provided at the ITA 10 and a busy tone is played at telephone 16. Note further that the program passes through to the end block 88, via step 86, when the "internet on" indication is in the "OFF" state indicating ITA 10 is not logged onto the internet at the time that the party 18 attempts to initiate a long distance call via the internet. The processes carried out by the ITA's 10, 20 are further elucidated by reference to FIGS. 5–7.

Figure 5:
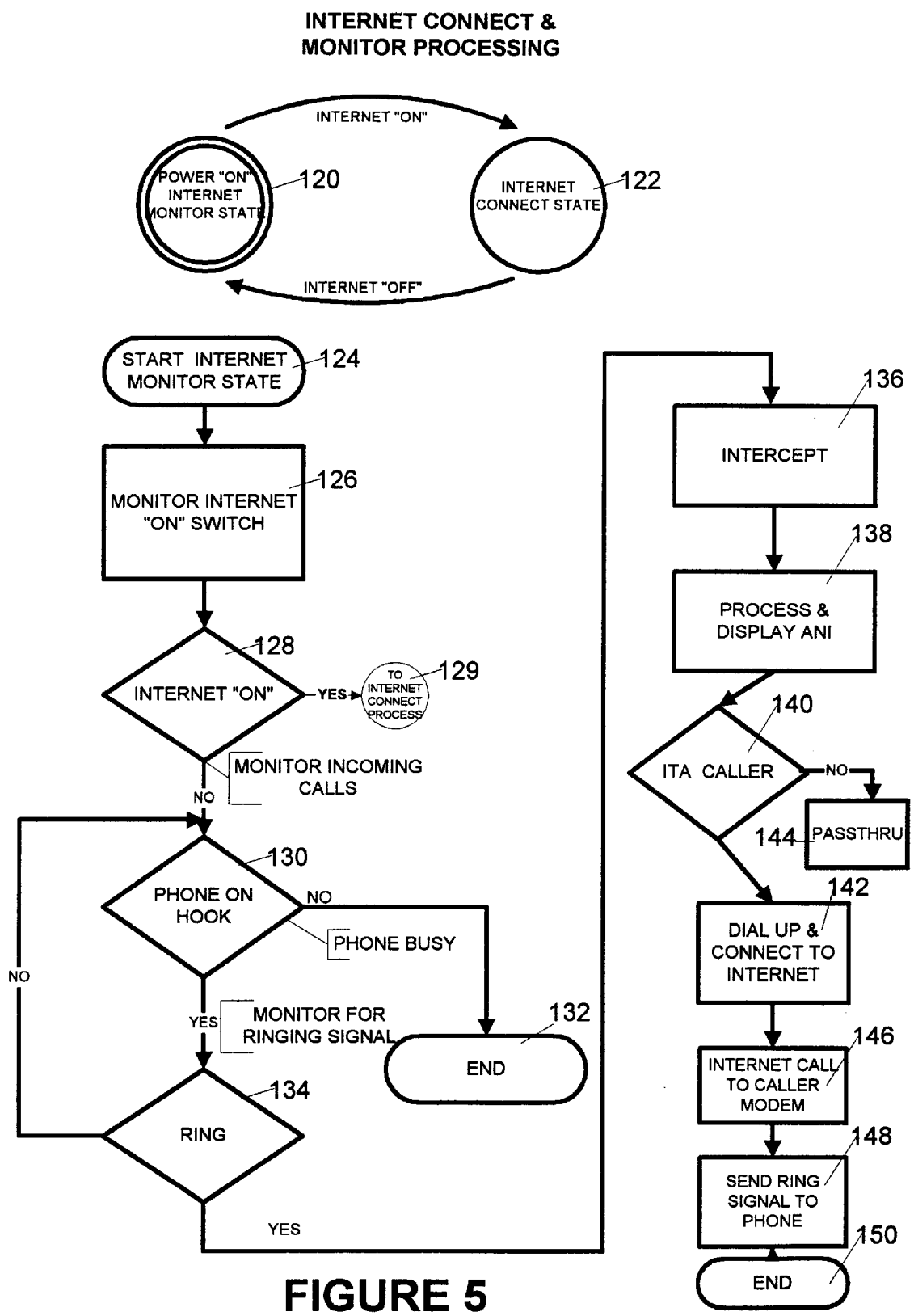
FIG. 5 is a software block diagram of the internet connect and monitor processing function of the software.

FIG. 5 indicates that the ITA resident software maintains two main states: an internet monitor state 120 that continuously monitors whether the operator has depressed the Internet ON switch or whether a sending ITA has signalled this receiving ITA to connect to the internet and an Internet Connect state 122 which connects the ITA to the internet once the Internet ON switch has been turned on. Step 124 starts the monitoring process, whereby the software proceeds to step 126 to determine whether the internet ON switch (not shown) has been turned on by the operator at the ITA 10. If at step 128 it is determined that the switch had not been previously turned on and the ITA is not presently connected to the internet service provider (ISP), the program proceeds to the internet connect process 129 which involves calling the ISP and logging onto the internet. Otherwise, the program turns to the task of monitoring incoming calls starting at step 130 where the program inquires whether the phone is off hook. If so, the ITA considers the phone busy whereby the phone goes to the end of procedure at step 132.

If on the other hand the phone is determined to be on hook (not in use), the program awaits at step 134 ringing of the telephone by looping around to step 130 to determine whether a calling ITA is signalling this receiving ITA to connect to the internet. As soon as ringing of the telephone is detected, the call is answered at step 136 and processing ensues which includes the displaying of ANI (automatic number identification) information. Step 140 involves determination of whether the call is from another ITA (i.e. the special modem device of the present invention). If not, the call is simply passed through to the telephone 24 (step 144), as it is interpreted to be a routine call. Otherwise, the process proceeds to step 142 where the program dials up its preprogrammed ISP number and thus connects the telephone 24 to the internet. At this point, the ITA 20 calls the first telephone 10 by looking up its e-mail address based on its knowledge of the calling number that was received via the ANI data. Alternatively, when ANI is not available, the E-mail address of the sending ITA 10 is determined by means of the ITA-to-ITA call set up signal described in step 98 of FIG. 4. When the connection is thus completed, the telephone 24 begins to ring (step 148) to alert the user 22 of the incoming internet call.

Alternatively, the telephone 24 may be caused to ring before the internet connection is completed (preferably with a peculiar ring sound), enabling the telephone owner 22 to actuate a button on the ITA which immediately informs the calling ITA 10 to await the called ITA's connection to the internet.

Figure 6:
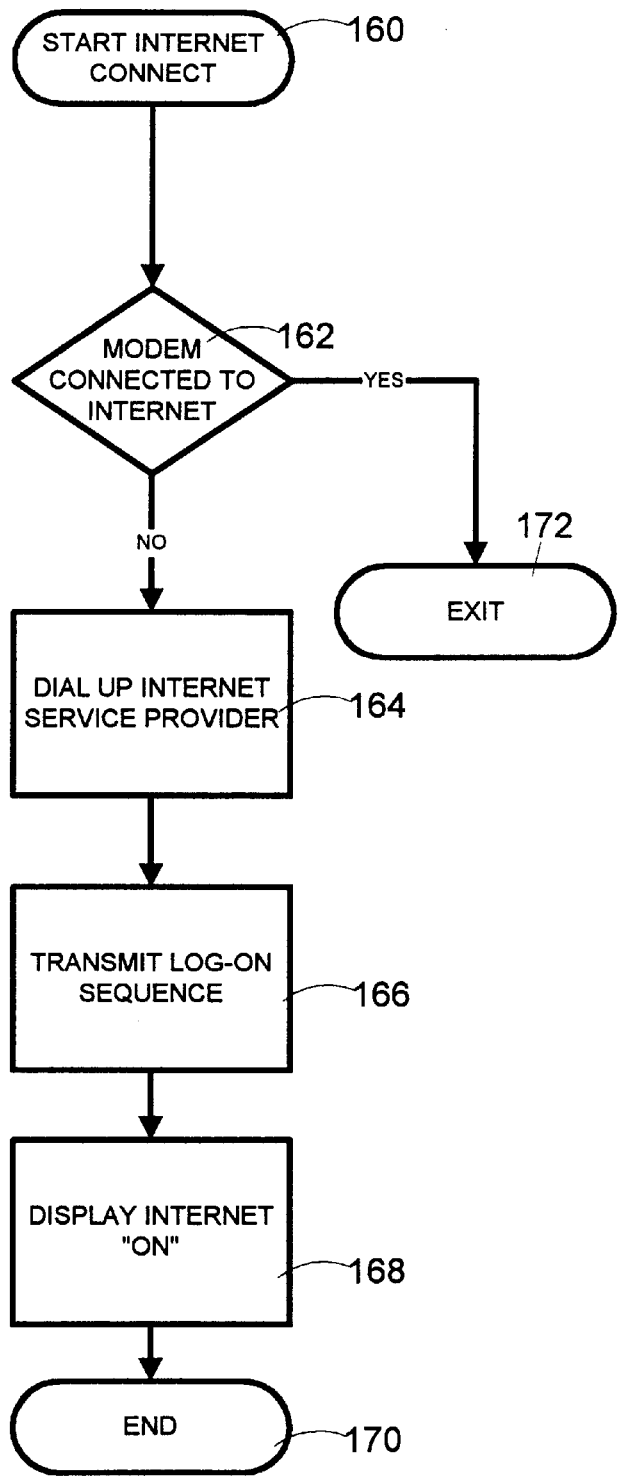
FIG. 6 is a further software block diagram of the internet connect processing function of the ITA.

Referring to FIG. 6, the process of connecting the ITA 10, 20 to the internet is follows. The routine starts with various initialization processes at step 160. If it is determined at step 162 that the ITA 10 (or 20) is already logged on to the internet, the program exits at step 172. If not, the microprocessor 30 dials the ISP at step 164 and proceeds with the usual log-on sequence at step 166. As soon as confirmation of the log-on has been received, the internet connected light (e.g. an LED, not shown) is lit to indicate at a glance to the telephone owner that the ITA is logged on to the internet and the sequence is terminated at step 170.

Figure 7:
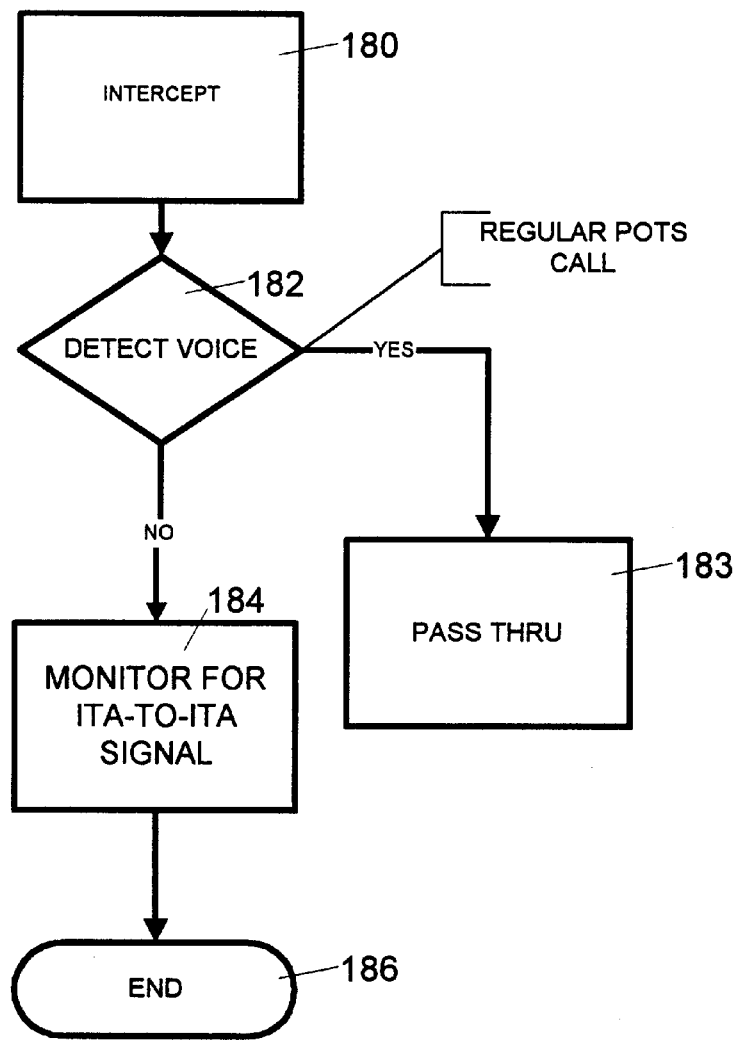
FIG. 7 is a block diagram of the detect voice/modem software function of the present invention.

To prevent ordinary voice calls from incurring noticeable delays due to the receiving ITA 20 intercepting all incoming calls while it monitors for sending ITA 10 "connect to internet" signals, a voice detection function is provided to instantly distinguish between ordinary voice calls which bypass the ITA (passthru) and ITA-to-ITA signals. This preserves the ability of the user to transparently use his conventional telephone instrument for ordinary calls. This is illustrated in FIG. 7 in which the ringing of the telephone 24 is intercepted by the user's answering of the call at step 180. If conventional voice is then received (step 182), the call is an ordinary voice call (step 183). On the other hand, if voice is not detected, processing proceeds to step 184 in which ITA 20 monitors for ITA-to-ITA setup signals as previously described.

The concept of the invention lends itself to many adaptations. For example, the ITA 20 may be programmed to answer an internet call and then route that call locally, e.g. within a home, office, etc. More specifically, the calling ITA 10 may be programmed to call the same e-mail address for a number of remote telephone numbers found within the same home or office which share the same e-mail address. Once the internet link has been established, the called ITA 20 is programmed to receive from the calling ITA 10 the stream of digits representing the actual intended telephone number which is then dialed by the ITA over another telephone line and once the ultimate telephone answers the internet call is "conferenced" unto that telephone and the calling parties can converse naturally. Naturally, it is evident that the ITA devices of the present invention can be used to "call forward" telephone calls. Another inherent feature of the ITAs of the present invention is that they could be used as speech synthesizers at both the sending and receiving ends, as it is simple to store various voice commands or helpful instructions in the memory of the device and then play it back to the user.

Another feature comprises maintaining a database of telephone numbers equipped with the ITA device of the present invention, the data base being located at the ISP. In this case, completion of a call would also entail possible consulting of the ISP database to find a less expensive e-mail address for the intended telephone, if it exists. Such a service might be a source of revenue for the ISP, more so than existing telephone directories due to the fully automated nature of the service. Or owners of ITA's might log on to a service and down load an ITA e-mail telephone directory into the local memory 58 of the ITA.

Given the modest amount of electronic hardware required for fabricating the ITA, the housing 52 thereof could be comparatively (e.g. to a PC) quite small, on the order of a telephone hand set or even much smaller when use is made of surface mounted devices and other miniaturization techniques. Indeed the entire ITA could be housed within the housing of a conventional telephone without any enlargement of the telephone housing. It is easily within the realm of existing technology to fabricate the entire ITA in a housing defining a space of less than about 15–20 cubic inches. Still further, while the inventors presently contemplate that the keypad 44 will have a full alpha numeric capability, they also conceive that information could be stored in the ITA via the keyboard of the telephone instrument or by connecting the ITA to a computer via an RS-232 interface or the like or by calling one's PC computer via e-mail or via a 900 fee based telephone number.

Still further, since many purchasers of ITA might not be ordinarily logged on to the internet and since conventional telephone connections could be established faster than e-mail connections, the invention also comprises the process of having the ITA call first the called telephone conventionally and proceed as follows. If the telephone is busy, it will be assumed that the called ITA is already connected to its ISP and a connection will be attempted via the internet. If not, the called ITA will cause a peculiar ring to be heard at the telephone 24 and expect a peculiar sequence of keys to be punched at the telephone by the called party 22. Once the keys have been depressed, the conventional call will immediately terminate and the called telephone will proceed to connect itself to its respective ISP. This conventional call could last no more than about 20 seconds and will avoid a longer unnecessary internet call when the called telephone is busy or its owner is not available or the like.

Among other things, the ITA of the present invention is distinguished from conventional PCs, which are by comparison much larger, more complex and considerably more expensive. The ITA is basically a dedicated device that ordinarily remains connected to a conventional telephone. Although it conceivably could include a telephone directory, a calendar or the like, it is neither a PC, nor a laptop computer nor even a notebook computer, all of which are well known devices and none of which is a telephone accessory in the sense of the present invention.

Also note that the term microprocessor of the present invention includes a digital signal processor, or any controller IC or digital hardware that performs the central control functions of the present invention. Moreover, while reference has been made to telephone lines, the same term encompasses and includes ISDN lines and the like.

Although the present invention has been described above with reference to preferred embodiments thereof, many variations, modifications and adaptations thereof will become apparent to those skilled in the art which embody the concepts disclosed by the present invention. Accordingly, all such variations, adaptations, etc. are deemed to be part of the invention which is further defined by the claims recited below.

We claim:

1. An internet telephone accessory (ITA) dedicated to a respective first telephone to enable the first telephone to call a second telephone over the Internet, the ITA comprising:
   a housing located outside of a personal computer (PC) and including therein a modem for sending and receiving digital information over telephone lines, a memory for including at least one Internet address, a codec for converting analog and digital voice signals to digital and analog signals, respectively, and a control processor;
   the housing including not more than three electrical connectors comprising a first telephone jack for connecting to the conventional first telephone and a second telephone jack connecting the ITA to a telephone wall jack;
   a first software facility structured to enable dialing of the second telephone via an internet service provider (ISP) and from the ITA of the first telephone and a second software facility for enabling placing a voice call to the conventional second telephone connected to the Internet, whereby a long distance telephone call could be established over an internet telephone channel without use of conventional computer equipment.

2. The telephone accessory of claim 1, including:
   a third software facility for determining whether the second telephone has responded to the call from the first telephone via an internet telephone channel.

3. The telephone accessory of claim 2, including a fourth software facility responsive to the third software facility and structured to call the second telephone over a non-internet telephone line when the second telephone had not responded over the internet telephone channel to the first telephone, to cause the second telephone to connect itself to the internet.

4. The telephone accessory of claim 3, in which the housing lacks a full alpha-numeric keyboard set of a conventional computer.

5. The telephone accessory of claim 3, in which the three connectors include a power connector for supplying electrical power for powering the modem and other electrical components in the housing.

6. The telephone accessory of claim 3, including a conventional telephone located in the housing.

7. The telephone accessory of claim 3, including a non-volatile memory for the storage of an e-mail directory therein and for converting conventional telephone numbers to corresponding e-mail addresses.

8. The telephone accessory of claim 3, including an alphanumeric keyboard set.

9. The telephone accessory of claim 8, including a display for displaying a calling telephone number.

10. The ITA of claim 1, in which the first software facility causes the ITA of the first telephone to dial the second telephone by transmitting an e-mail address associated with the second telephone.

11. The ITA of claim 1, in which the ITA is the sole device connected between the first telephone and the first telephone wall jack.

12. An Internet telephone accessory which is not part of a personal computer (PC) for facilitating establishing telephone calls over the Internet, comprising:
    a housing essentially including therein a modem, an a/d codec, a memory including at least one Internet address and a processor and defining an interior space of less then about fifteen cubic inches;
    the housing including a first connector by which the modem is connectable to a telephone wall jack and a second connector for coupling the codec to a first telephone;
    the processor including software programs which enable placing calls from the first telephone and connecting/interfacing and controlling the modem and the codec to convert analog voice signals to streams of digitized data suitable for being transmitted over an internet line, and for receiving and converting digitized internet-originated voice data to analog voice signals suitable to be converted to sound by the first telephone, so that the first telephone equipped with the telephone accessory could establish a voice path over the internet with a second telephone connected to the Internet.

13. The telephone accessory of claim 12, in which the software program includes a first software facility for converting an ordinary telephone number dialed at the first telephone to a corresponding e-mail address associated with the second telephone and for placing a call to the e-mail address.

14. The telephone accessory of claim 13, including a second software facility for determining whether the second telephone is connected to an internet service provider thereof and, if not, for placing a call to the second telephone over a conventional telephone number and for transmitting a command to a second Internet telephone accessory (ITA) of the second telephone to command the second Internet telephone accessory to connect the second telephone to its respective internet service provider.

15. The telephone accessory of claim 11, the housing including a dedicated, manually actuatable switch for actuating the software program to connect the first telephone to its internet service provider.

16. The telephone accessory of claim 13, including a software facility for detecting that an incoming call is originating from a modem of the telephone accessory of the first telephone.

17. The telephone accessory of claim 13, including a keyboard.

18. The telephone accessory of claim 13, including means for connecting the modem to one or another of two telephone lines, one of which is dedicated by a software facility to send and receive conventionally dialed telephone calls and the other internet calls that are placed via e-mail addresses.

19. A method for effecting long distance telephone calling over an internet channel, including the steps of:
   providing a first telephone that is connected to a telephone line via a non-PC internet telephone accessory (ITA) which includes:
      a housing located outside a personal computer (PC) and essentially including therein a modem, an a/d codec, a memory including at least one Internet address and a processor and defining an interior space of less then about twenty cubic inches;
   providing a second telephone equipped with its respective non-PC internet telephone accessory;
   causing the first telephone to connect itself to a respective internet service provider;
   thereafter dialing the second telephone by dialing its conventional telephone number and automatically converting the conventional telephone number to a respective e-mail address thereof to establish a telephone hook-up via the Internet, and transmitting digital voice between the first and second telephones over the Internet.

20. An Internet telephone accessory (ITA), comprising:
   a housing located outside a personal computer (PC) and including therein a modem for sending and receiving digital information over telephone lines, a codec for converting analog and digital voice signals to digital and analog signals, respectively, a memory including at least one Internet address and a control processor;
   the control processor including a first software facility structured to enable dialing of an internet service provider (ISP) from the first telephone, a second software facility for enabling placing a voice call to a conventional second telephone connected to a second Internet telephone accessory, and a third software facility for calling the second telephone over a conventional telephone line to prompt the second telephone to connect itself to its respective internet service provider, whereby a long distance telephone call could be established over an internet telephone channel without use of conventional computer equipment.

21. The telephone accessory of claim 20, including a software facility for causing the second telephone to call back the first telephone via the internet, using ANI information to identify the calling first telephone.

22. A method for effecting long distance telephone calling over an internet channel, including the steps of:
   providing a first conventional telephone that is connected to a telephone line via an internet telephone accessory which includes: a housing located outside a personal computer (PC) and essentially including therein a modem, an a/d codec, a memory including at least one Internet address and a processor and which first telephone is not connected to a personal computer;
   providing a second telephone equipped with its respective internet telephone accessory and which is also not connected to a personal computer;
   causing the first telephone to connect itself to a respective internet service provider;
   thereafter dialing the second telephone via an e-mail address thereof, and transmitting digital voice between the first and second telephones.

* * * * *